(12) United States Patent
Ochi

(10) Patent No.: US 6,931,896 B2
(45) Date of Patent: Aug. 23, 2005

(54) STEERING LOCK APPARATUS

(75) Inventor: Isao Ochi, Aki-gun (JP)

(73) Assignee: U-Shin Ltd., Tokyo (JP)

( * ) Notice: Subject to any disclaimer, the term of this patent is extended or adjusted under 35 U.S.C. 154(b) by 252 days.

(21) Appl. No.: 10/300,851

(22) Filed: Nov. 21, 2002

(65) Prior Publication Data

US 2004/0099082 A1 May 27, 2004

(51) Int. Cl.$^7$ .............................. B60R 25/02; G05G 5/00
(52) U.S. Cl. .............................. 70/186; 70/252; 70/182
(58) Field of Search ............................ 70/182–186, 252

(56) References Cited

U.S. PATENT DOCUMENTS

| | | | |
|---|---|---|---|
| 3,686,906 A | * 8/1972 | Watkins et al. | 70/252 |
| 4,837,567 A | * 6/1989 | Kleefeldt et al. | 340/5.72 |
| 5,036,686 A | * 8/1991 | Ichinose | 70/186 |
| 5,255,547 A | * 10/1993 | Burr et al. | 70/252 |
| 6,539,756 B2 | * 4/2003 | Bartels et al. | 70/186 |
| 6,751,991 B2 | * 6/2004 | Tamukai | 70/186 |
| 6,786,069 B2 | * 9/2004 | Ochi | 70/252 |

FOREIGN PATENT DOCUMENTS

| | | |
|---|---|---|
| JP | 61-28851 | 8/1986 |
| JP | 3029059 | 4/2000 |

* cited by examiner

*Primary Examiner*—John B. Walsh
(74) *Attorney, Agent, or Firm*—Wenderoth, Lind & Ponack, L.L.P.

(57) ABSTRACT

A steering lock apparatus is composed of: a rotational member having an engagement member; an operating portion positioned on a front side of and connected to the rotational member; a holder for holding the rotational member rotatably in forward and backward directions, and for holding the same rotatably in a rear position; an actuator driven by a signal transmitted by a controller upon detection of the rotational member being operated toward a rear side; and a lock member that is operated by the actuator to be engaged with the engagement member of the rotational member in LOCK position for preventing rotation of the rotational member. The rotational member is held rotatably in a rear position and disabled from moving to a front position when the rotational member is operated to a rear position to release engagement between the engagement member of the rotational member and the lock member.

3 Claims, 12 Drawing Sheets

Fig.4

STEERING LOCK APPARATUS

BACKGROUND OF THE INVENTION

The present invention relates to a steering lock apparatus for use in vehicles and the like.

Conventionally, a cylinder lock that allows locking and unlocking without a key has been disclosed in e.g., Japanese Utility Model Kokoku Publication No. 61-28851. This cylinder lock has a rotor equipped with plate-shaped tumblers, and a rotational cylinder with tumbler engagement grooves formed on an inner circumferential face is provided on an outer circumference of the rotor. In the rotational cylinder, there is provided a hole for fitting a top end portion of a plunger driven by an electromagnetic solenoid. When the electromagnetic solenoid is off, the plunger is fit into the hole to prevent rotation of the rotational cylinder, whereas when the electromagnetic solenoid is on, the plunger leaves the hole to bring the rotational cylinder into a rotatable state. For unlocking the cylinder lock with use of a key, the key is inserted into the rotor so that the tumblers sink into the rotor, which releases engagement between the tumblers and the grooves of the rotational cylinder, and thereby enables the rotor to rotate in precisely the same way as general cylinder locks. For unlocking the cylinder lock without use of a key, the electromagnetic solenoid is operated to pull the plunger out of the hole of the rotational cylinder so as to make the rotational cylinder rotatable. In this state, holding and rotating a knob provided on a front face of the rotor implements cooperative rotation of the rotor and the rotational cylinder since the tumblers of the rotor are in engagement with the tumbler engagement grooves of the rotational cylinder.

Generally in steering lock apparatuses, when a key is inserted and a cylinder is rotated from LOCK position to ACC position with use of the key, a steering shaft is unlocked, and this unlocking state is maintained in ON position, Start position, ACC position, and LOCK position after once unlocking the steering shaft. Then, the steering shaft is locked when the key is extracted from the key cylinder in LOCK position. However, in the known steering lock apparatus, since key extraction cannot be detected, operating the key or the knob to the LOCK position after unlocking the steering shaft causes a lock shaft spring out, and thereby locks the steering shaft.

SUMMARY OF THE INVENTION

Accordingly, in view of this point, it is an object of the present invention to provide a steering lock apparatus capable of maintaining an unlocking state once an unlocking operation is conducted, as well as preventing an erroneous locking operation during driving and the like.

In order to achieve the above object, a steering lock apparatus of the present invention is composed of: a rotational member having an engagement member; an operating portion positioned on a front side of the rotational member for rear movement and rotational operation of the rotational member; a holder for holding the rotational member movably in forward and backward directions and for holding the same rotatably in a rear position; an actuator driven by a signal transmitted by a controller upon detection of the rotational member being operated toward a rear side; and a lock member that is operated by the actuator so as to be engaged with the engagement member of the rotational member in LOCK position for preventing rotation of the rotational member, with the rotational member being held rotatably in a rear position and disabled from moving to a front position when the rotational member is operated to a rear position to release engagement between the engagement member of the rotational member and the lock member.

Also, in the steering lock apparatus of the present invention, the engagement member of the rotational member may include a slide groove provided in an axial direction on a lateral wall of the rotational member, and a slide member movably provided in the slide groove and pressed to a rear side by a spring. The slide member may have a first engagement portion that engages with the lock member to prevent rotation of the rotational member and movement of the slide member toward a rear side, and a second engagement portion that engages with the lock member to prevent movement of the slide member toward a front side together with the rotational member, with the sliding member being pressed by the spring when the first engagement portion of the slide member engages with the lock member and the rotational member is operated toward a rear side, then the slide member being moved toward the rear side inside the slide groove by a pressing force of the spring after releasing engagement between the slide member and the lock member, and the lock member being operated to be in a lock state again at a time during which the lock member engages with the second engagement portion of the slide member to prevent movement of the rotational member toward a front side.

Further, the steering lock apparatus of the present invention may be provided with a pressing member for pressing the rotational member toward a front side, with the pressing member moving the rotational member to a front position when engagement of the second engagement portion of the slide member with the lock member is released.

According to the steering lock apparatus of the present invention, once the rotational member is pressed toward the rear side so as to unlock the lock thereof, the rotational member is disabled from moving toward the front side, which prevents mis-operation of the rotational member toward the front side during driving and the like, and eliminates danger of the steering lock being locked.

Also, in locking and unlocking rotation of the rotational member, the actuator needs to be operated only for a short period of time, which achieves steering lock operation with small power consumption.

Further, a driver does not need to operate an operating portion toward the front side when getting out of an automobile since the operating portion is automatically returned to an initial state, which makes it possible to prevent the steering shaft from being left in an unlocked state.

BRIEF DESCRIPTION OF THE DRAWINGS

The present invention will be further described with reference to the accompanying drawings wherein like reference numerals refer to like parts in several views, and wherein:

FIG. 4 is a cross sectional view showing the steering lock apparatus of the present invention in a state of being unlocked;

FIG. 11A is a plan view showing the rotational member of the steering lock apparatus of the present invention, while

FIG. 13A is a cross sectional view of FIG. 1 taken along line A—A, while

DETAILED DESCRIPTION OF THE PREFERRED EMBODIMENTS

Figure 1:
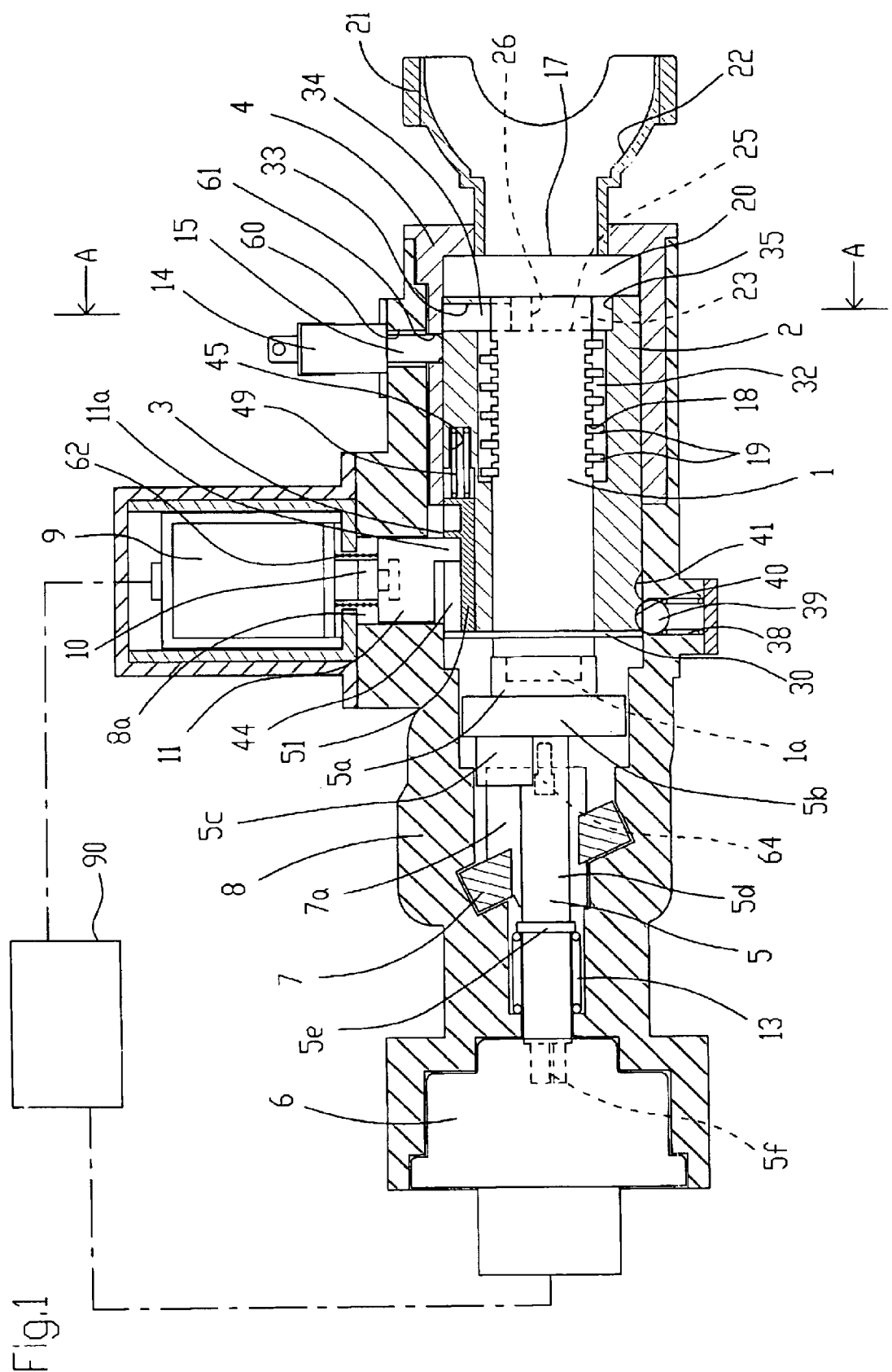
FIG. 1 is a cross sectional view showing a steering lock apparatus of the present invention in a state of being locked.
Figure 2:
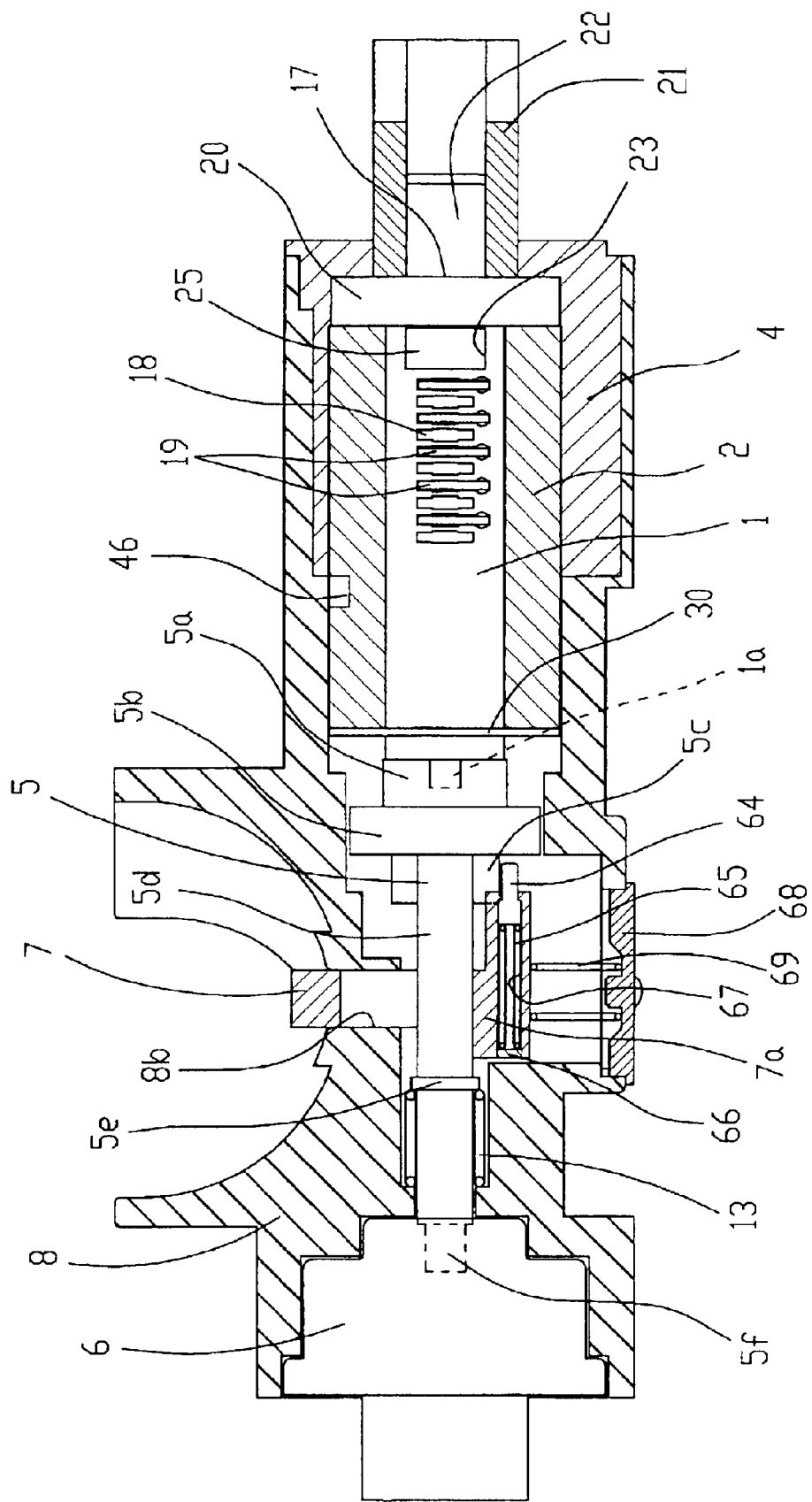
FIG. 2 is a cross sectional view displaced by 90° from the cross sectional view of FIG. 1 showing the steering lock apparatus of the present invention in the state of being locked.

FIG. 1 is a cross sectional view showing a steering lock apparatus of the present invention before operation, and FIG. 2 is a cross sectional view displaced by 90' from the cross sectional view of FIG. 1. It is noted that the right side is referred to as "front" and the left side is referred to as "rear" in a longitudinal direction of the cross sectional views showing the steering lock apparatus for the sake of convenience.

The steering lock apparatus mainly has a key cylinder 1 with an operating knob 21 secured on a front face thereof, a rotational member 2 for holding the key cylinder 1 in a rotatable manner, an engagement member 3 that comes into engagement with a later-described lock member 11, and a holder 4 for holding the rotational member 2 movably in forward and backward directions, i.e., left and right direction in these drawings, and for holding the same rotatably in a rear position that is the left side in the drawings.

The key cylinder 1 is connected to a cam member 5 via a connection protruding portion 1a, so that rotating the key cylinder 1 cooperatively rotates the cam member 5, which rotates a rotor (not shown) of a switch portion 6 provided on a rear end side of the cam member 5, resulting in execution of a specified switch operation. Rotation of the cam member 5 operates a lock shaft 7, by which an unshown steering shaft is locked. Each of the above-mentioned members is housed in a body 8. On the body 8, there is fixed an electromagnetic solenoid 9 that is an actuator. In a through-hole 8a formed in the body 8, there is movably disposed the lock member 11 connected to a top end portion of a driving shaft 10 of the electromagnetic solenoid 9. The lock member 11 engages with the engagement member 3 of the rotational member 2 to restrain a rotating operation of the rotational member 2. Between an engagement brim portion 5e of the cam member 5 and the body 8 at a surrounding portion of the rear end side of the cam member 5, there is disposed a spring 13, which presses the cam member 5, the key cylinder 1, and the rotational member 2 to the front side, that is, the right side in the drawings.

On a front-side outer circumferential face of the body 8, there is fixed a key detection switch 14 for detecting insertion of a key into the key cylinder 1. The key detection switch 14 is equipped with an actuating lever 15, which conducts a current to the key detection switch 14 when pressed. The actuating lever 15 is inserted into a switch introduction hole 60 formed in the body 8 and a through-hole 61 formed in the holder 4 in a state of being pressed outside by an unshown spring disposed in the key detection switch 14.

Figure 14:
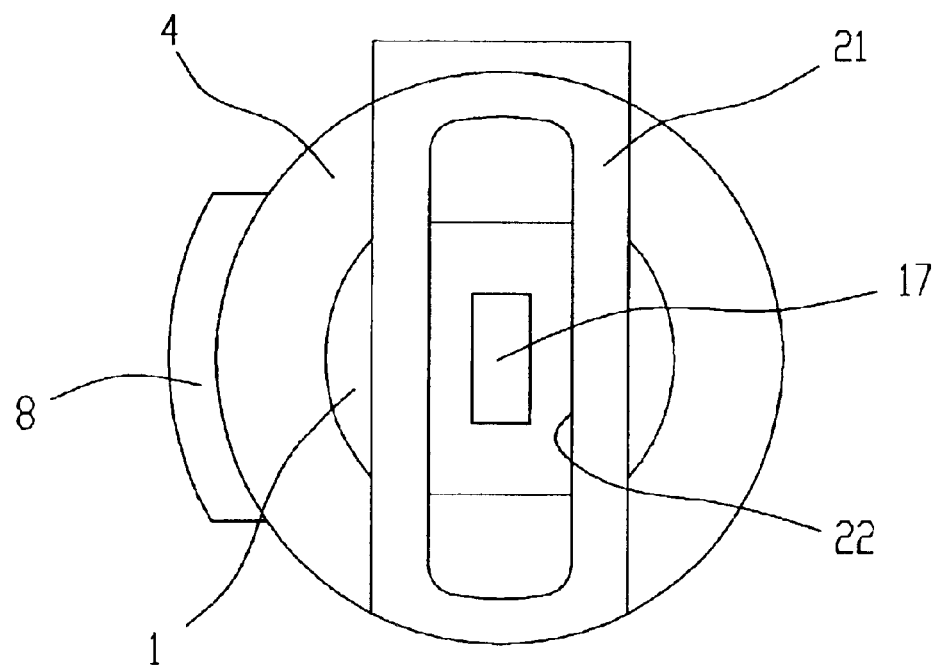
FIG. 14 is a side view showing a front end face of the steering lock apparatus of the present invention.

The key cylinder 1 has a columnar shape, and a rectangular key insertion hole 17 is formed in a central portion thereof as shown in FIG. 1 and FIG. 14. On an outer circumferential face of the key cylinder 1, a plurality of tumbler holes 18 connected to the key insertion hole 17 is provided on both sides at specified intervals in an axial direction. In each of the tumbler holes 18, there is provided a tumbler 19 pressed by an unshown spring in a radial direction. Similar to known cylinder locks, when a key is inserted into the key insertion hole 17, each tumbler 19 sinks into the key cylinder 1.

On a front side of the key cylinder 1, there is provided a brim-like portion 20 protruding annularly, and on a front face of the brim-like portion 20, there is secured an operating knob (operating portion) 21. Inside the operating knob 21, there is provided a key installation hole 22 through which the key can be introduced into the key insertion hole 17.

Figure 13A:
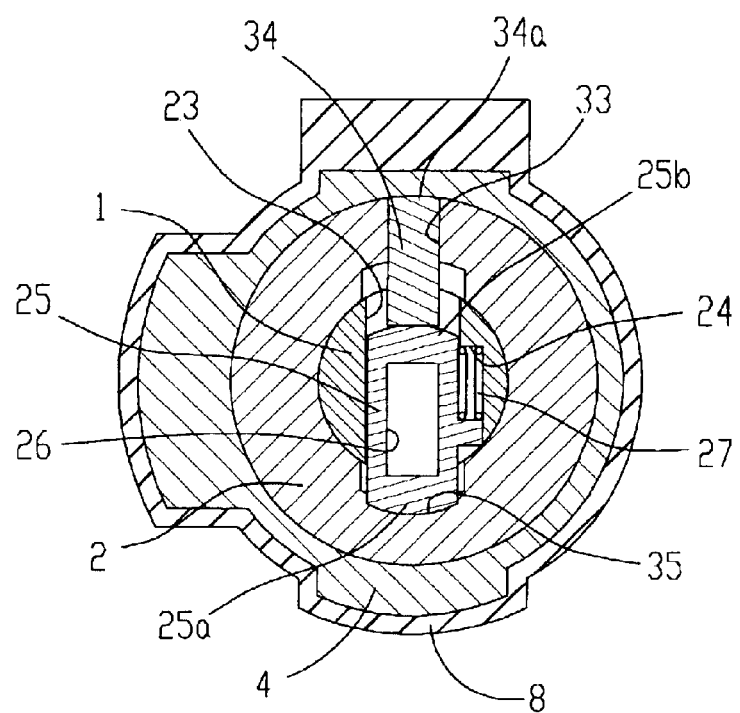
Figure 13B:
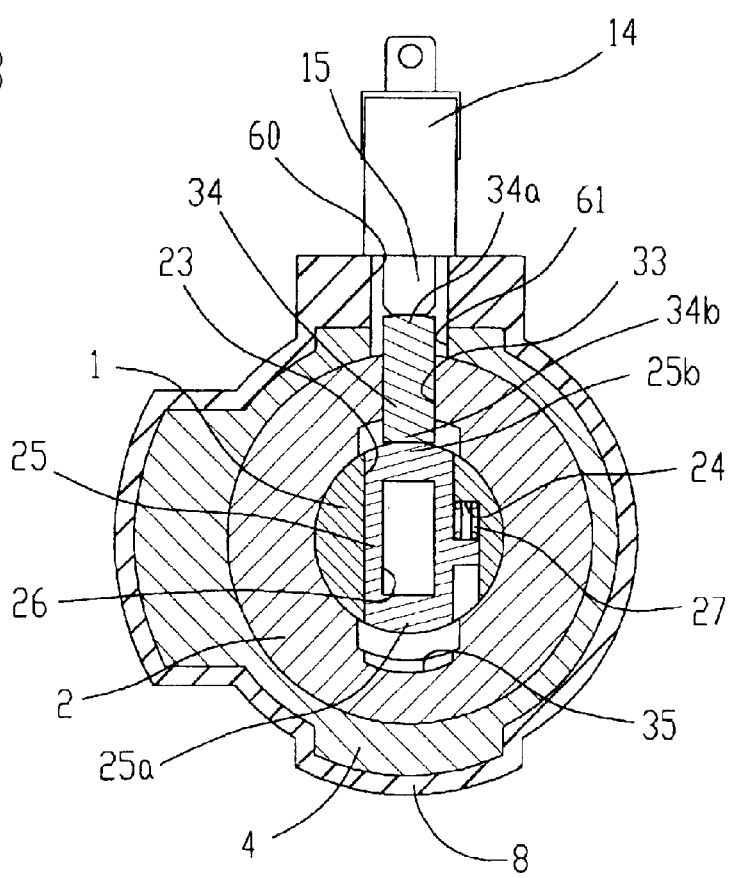
FIG. 13B is a cross sectional view of FIG. 12 taken along line C—C.

Also, the key cylinder 1 is provided with a hole 23 formed in radial direction and a spring installation hole 24 connected to the hole 23 between the brim-like portion 20 and the tumbler hole 18 as shown in FIG. 13A. In the hole 23, a slider 25 having a rectangular introduction hole 26 for introducing a key in a central portion thereof is movably provided and pressed in radial direction by a spring 27 installed in the spring installation hole 24 as shown in FIG. 13A. When a key is not inserted into the key cylinder 1, a top end portion 25a of the slider 25 projects from the outer circumferential face of the key cylinder 1 to prevent rotation of the key cylinder 1 relative to the rotational member 2 in cooperation with the tumblers 19, as shown in FIG. 13A. When a key is inserted into the key cylinder 1, the slider 25 is moved to a position where the top end portion 25a and a rear end portion 25b of the slider 25 are aligned with the outer circumferential face of the key cylinder 1 as shown in FIG. 13B.

As shown in FIG. 1, on a rear end portion side of the key cylinder 1, C ring 30 is installed for securing the key cylinder 1 on the rotational member 2. The C ring 30 is installed on the key cylinder 1 after the key cylinder 1 is inserted into the rotational member 2 from the right side of this drawing, by which the rotational member 2 is prevented from detaching from the key cylinder 1. An outside diameter of the C ring 30 is almost equal to an outside diameter of the rotational member 2. On the rear end portion of the key cylinder 1, there is formed a connection protruding portion 1a protruding toward the rear side for connecting the key cylinder 1 to the cam member 5.

The rotational member 2 has a cylindrical shape, and a pair of tumbler engagement grooves 32 are formed along an axial direction in symmetrical positions in an inner circumferential face of the rotational member 2. A top end portion of each tumbler 19 engages with a corresponding tumbler engagement groove 32 to disable the key cylinder 1 from rotating. There is formed a through-hole 33 penetrating in radial direction as shown in FIG. 13A in a position corresponding to the hole 23 of the key cylinder 1 on the right side of the tumbler engagement grooves 32 in FIG. 1. In the through-hole 33, there is movably provided an engaged member 34 whose end portion comes into contact with the rear end portion 25b of the slider 25 of the key cylinder 1. In a position of the rotational member 2 opposed to the through-hole 33, there is formed a fitting groove 35 which is connected to the tumbler engagement groove 32, and in which the top end portion 25a of the slider 25 of the key cylinder 1 fits.

The engaged member 34 moves with the slider 25 upon insertion of a key into the key cylinder 1 and presses the actuating lever 15 of the key detection switch 14, by which the key detection switch 14 is turned on. When a key is not inserted, the engaged member 34 is positioned so as to cross over the key cylinder 1 and the rotational member 2, and a top end portion 34a thereof matches with an outer circumferential face of the rotational member 2. With a key being inserted as shown in FIG. 13B, the engaged member 34 moves with the slider 25 so that the top end portion 34a thereof projects from the outer circumferential face of the rotational member 2, and a contact face between a rear end portion 34b of the engaged member 34 and the rear end portion 25b of the slider 25 aligns with a contact face between the key cylinder 1 and the rotational member 2, which releases connection between the key cylinder 1 and the rotational member 2.

As shown in FIG. 1, on the outer circumferential face of the rotational member 2, there are formed a semi-spherical first fitting hole 40 for fitting part of a ball 39 that is disposed in the body 8 and pressed by a ball spring 38 to a side of the rotational member 2 when the rotational member 2 is positioned toward the front side, and a semi-spherical second fitting hole 41 for fitting part of the ball 39 when the rotational member 2 is positioned toward the rear side. The ball 39 and these two fitting holes 40, 41 generate a clicking feel when the rotational member 2 is moved from a front position to a rear position or from the rear position to the front position, thereby ensuring movement of the rotational member 2 to the front position or the rear position.

Figure 8:
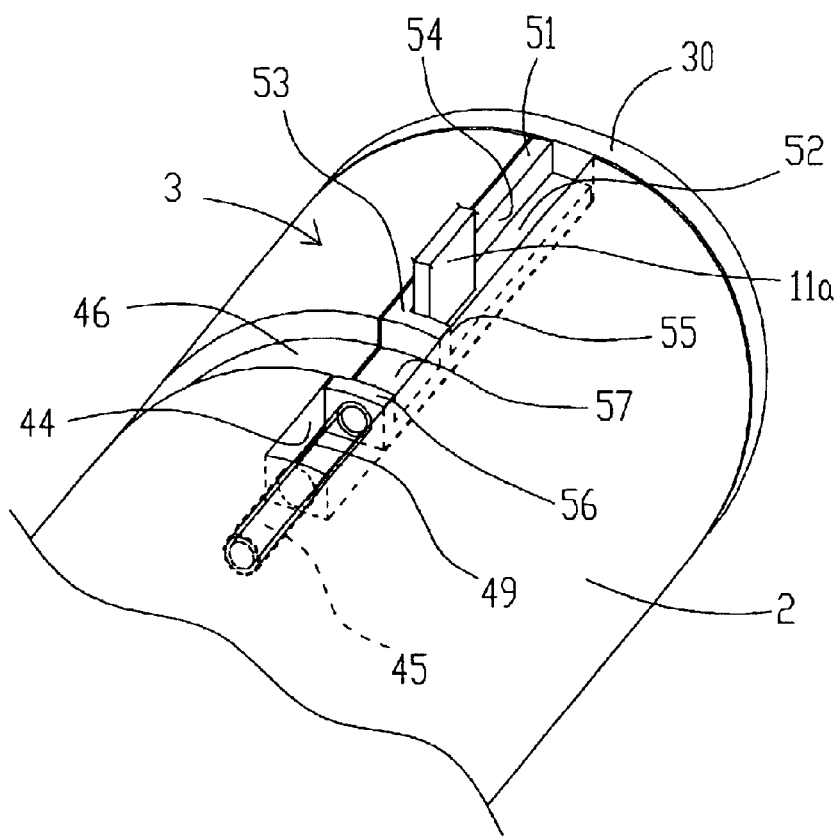
FIG. 8 is a fragmental perspective view showing a relationship between an engagement member of a rotational member and a lock member in a state of being locked as shown in FIG. 1.
Figure 11A:
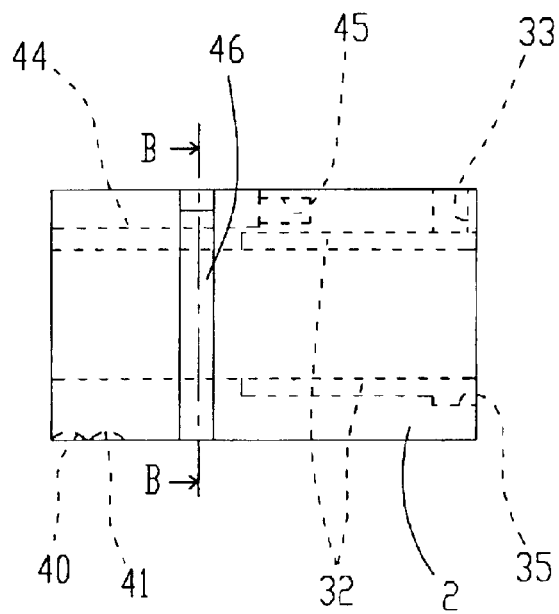
Figure 11B:
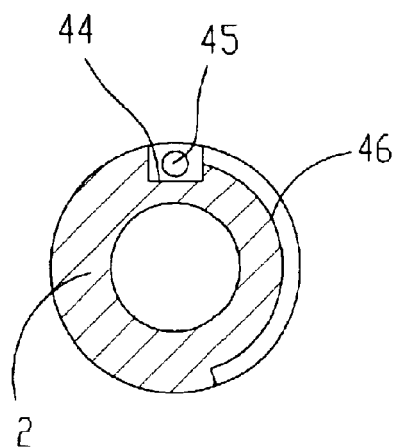
FIG. 11B is a cross sectional view of FIG. 11A taken along line B—B.

On the outer circumferential face of the rotational member 2, there is provided the engagement member 3 that engages with the lock member 11 and disables the rotational member 2 from rotating. The engagement member 3 is composed of a slide member 51 that engages with the lock member 11, a slide groove 44 for disposing the slide member 51 on the rotational member 2 movably in an axial direction, and a slide spring 49 for pressing the slide member 51 toward a side of the rear end portion of the rotational member 2. As shown in FIG. 8, the slide groove 44 is provided from a rear end portion to an approximately central portion on the outer circumferential face of the rotational member 2, and in a lateral wall on a central side provided is a spring installation hole 45 for installing the spring 49 in an axial direction. Also, on the outer circumferential face of the rotational member 2 in a position corresponding to an engagement protruding portion 11a of the lock member 11 when the rotational member 2 moves toward a rear position, there is formed an operation groove 46, one end of which connects to the slide groove 44, and another end of which extends in circumferential direction in a range of operation of the rotational member 2, i.e., a range of approximately 160 degrees, as shown in FIG. 11B.

As shown in FIG. 8, the slide member 51 is restrained by a lateral wall of the C ring 30 provided on the rear end portion of the key cylinder 1 and provided movably in the slide groove 44.

The slide member 51 has a substrate portion 52 and an approximately L-shaped first engagement portion 53 protruding from a top face of the substrate portion 52. A lateral wall portion of the first engagement portion 53 constitutes a rotation preventing portion 54 that engages with the lock member 11 for preventing clockwise rotation of the rotational member 2, and a movement preventing portion 55 that engages with the lock member 11 for preventing movement of the slide member 51 toward the rear side. In an end portion on a side of the slide spring 49 of the substrate portion 52, there is provided a board-shaped protruding portion 56 that protrudes from the top face of the substrate portion 52 and comes into contact with the slide spring 49. Between the board-shaped protruding portion 56 and the first engagement portion 53, there is formed an engagement groove 57 that is a second engagement portion, in which the lock member 11 is fit for preventing the slide member 51 from moving in forward and backward directions. A bottom face of the engagement groove 57 is structured to have a height identical to a height of a bottom face of the operation groove 46 provided in the rotational member 2 when the slide member 51 is disposed in the slide groove 44.

As shown in FIG. 1, after the holder 4, which is for holding the rotational member 2 rotatably and movably in an axial direction, is assembled to the rotational member 2, thus-integrated holder 4 and rotational member 2 are inserted into the body 8 from the right side of this drawing, i.e., the front side, and the holder 4 is mounted on a front opening portion of the body 8. The holder 4 has an approximately cylindrical shape, and in a specified position on a circumferential wall of the holder 4, there is provided a through-hole 61 for inserting a top end portion of the actuating lever 15 of the key detection switch 14 that detects insertion of a key into the key cylinder 1.

The switch portion 6 is for detecting the cam member 5 being moved toward the rear side. When the switch portion 6 detects that the key cylinder 1 and the rotational member 2 are operated toward the rear side and the cam member 5 is moved, a controller 90 is activated to receive an unlocking signal from an unshown electronic key, and if the unlocking signal is a proper signal, the controller 90 operates the electromagnetic solenoid 9 for a certain period of time. If the controller 90 cannot receive the unlocking signal from the electronic key in a certain period of time, the controller 90 determines that a driver carrying the electronic key is out of an automobile and operates the electromagnetic solenoid 9 for a certain period of time again.

The electromagnetic solenoid 9 operates upon reception of a signal from the controller 90, and in operation of the electromagnetic solenoid 9, a driving axle 10 is structured to move to a side of the electromagnetic solenoid 9. The lock member 11 is secured on a top end portion of the driving axle 10. On the top end portion of the lock member 11 on a side of the rotational member 2, there is protruded the engagement protruding portion 11a that engages with the slide member 51 and the slide groove 44 for preventing rotation of the rotational member 2. Between the lock member 11 and the electromagnetic solenoid 9, a spring 62 is provided around the driving axle 10, and when the electromagnetic solenoid 9 is not operated, pressing force of the spring 62 presses the lock member 11 to the side of the rotational member 2, which inserts the engagement protruding portion 11a of the lock member 11 into the slide groove 44 of the rotational member 2.

As shown in FIG. 2, a lock shaft 7 is movably installed in a hole 8b of the body 8, and a following portion 7a that engages with the cam member 5 is provided on a rear end portion thereof. On the following portion 7a, there is formed a pin installation hole 67 for installing a pin 64 and a pin spring 65, and the pin 64 and the pin spring 65 are housed in the pin installation hole 67 by a plug 66. The pin 64 is brought into contact with a lateral wall of a later described large diameter potion 5b of the cam member 5 by the pin spring 65. Also, the lock shaft 7 is pressed toward the lock shaft 7 by a lock spring 69 disposed between the following portion 7a and a lid portion 68 covering a lower opening portion of the body 8.

The cam member 5 is equipped with a connection portion 5a for being connected to the key cylinder 1, the large diameter potion 5b that is rotatable in a state of being supported on an inner circumferential face of the body 8, a cam portion 5c that engages with the following portion 7a of the lock shaft 7 for pulling the lock shaft 7 into the body 8, an axial portion 5d whose end portion 5f is connected to the switch portion 6, and the engagement brim portion 5e that protrudes like a brim from the axial portion 5d to press the spring 13.

Next description discusses operation of the steering lock apparatus having the above-described construction.

First, in a locking state shown in FIG. 1 and FIG. 2, the electromagnetic solenoid 9 is in an off state, where the engagement protruding portion 11a of the lock member 11 pressed to the side of the rotational member 2 by the spring 62 is inserted between the first engagement portion 53 of the slide member 51 and a lateral wall of the slide groove 44 as shown in FIG. 8, which prevents the rotational member 2 from rotating, thereby disabling a rotating operation. In this stage, a key is not inserted within the key insertion hole 17 of the key cylinder 1 having the operating knob 21 on its front face, and thus the tumblers 19 are protruding from the lateral wall of the key cylinder 1 and are in engagement with the tumbler engagement grooves 32 of the rotational member 2, so that the key cylinder 1 is also unable to rotate relative to the rotational member 2, and therefore rotation of the operating knob 21 is not possible.

Figure 3:
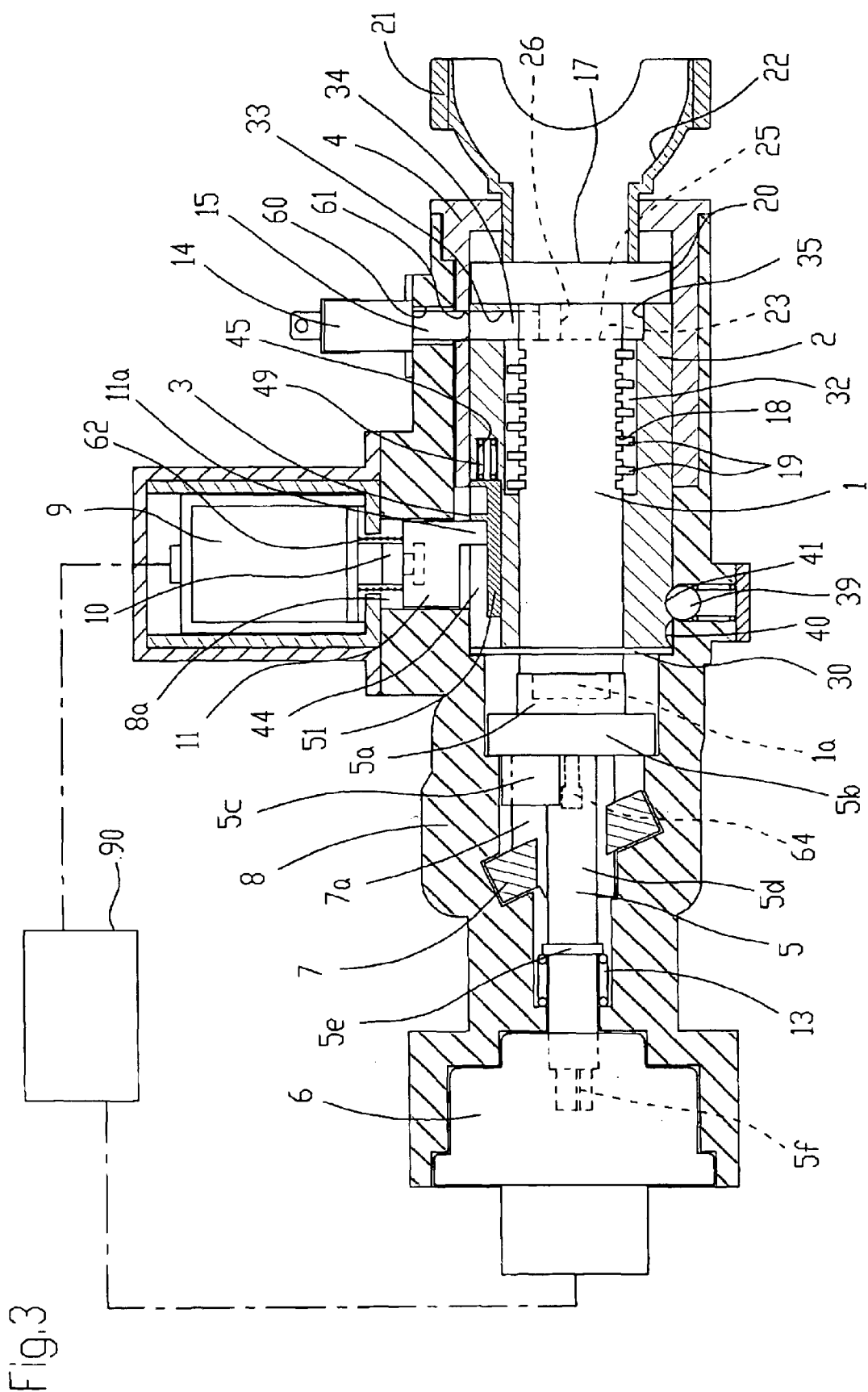
FIG. 3 is a cross sectional view showing the steering lock apparatus of the present invention with a rotational member being operated toward a rear side.

When a driver carrying an electronic key presses the operating knob 21 toward the rear side, the key cylinder 1 moves together with the rotational member 2 and the cam member 5 inside the body 8 to a rear position to be in the state of FIG. 3. Upon detection of this movement of the cam member 5, the switch portion 6 transmits a signal to the controller 90, which receives an unlocking signal transmitted from the electronic key and determines if the signal is proper or not. Here, as shown in FIG. 9, the movement preventing portion 55 of the first engagement portion 53 of the slide member 51 comes into contact with the engagement protruding portion 11a of the lock member 11, so that the slide member 51 is unable to move toward the rear side, and therefore the slide member 51 is in a state of being pressed toward the rear side by the slide spring 49.

Figure 5:
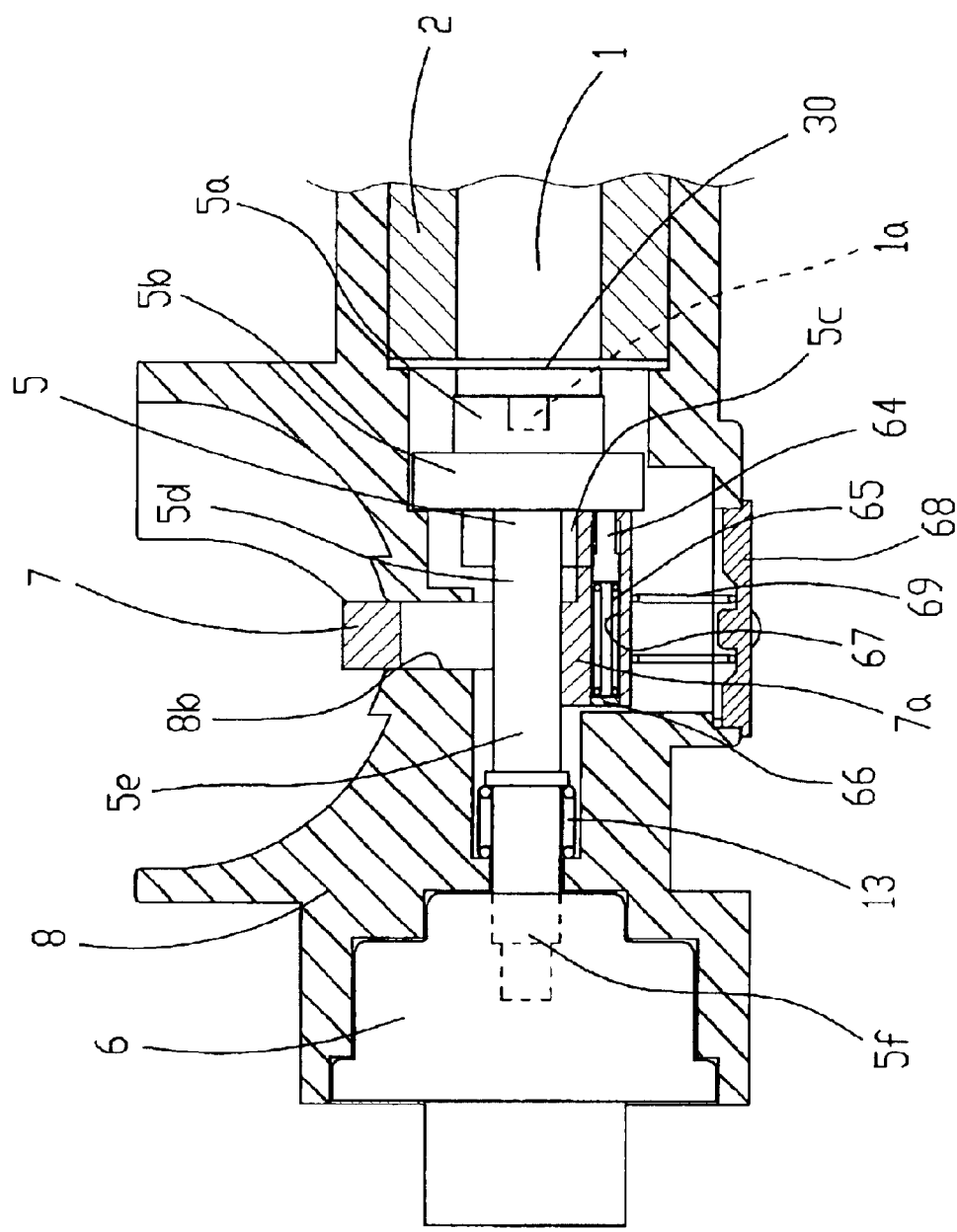
FIG. 5 is a cross sectional view showing a lock shaft of FIG. 3 and FIG. 4 in a state of being unlocked.

Further as shown in FIG. 5, with movement of the cam member 5, the pin 64 of the lock shaft 7 is pressed into the pin installation hole 67 by a lateral wall of the large diameter potion 5b of the cam member 5 against a pressing force of the pin spring 65.

Figure 9:
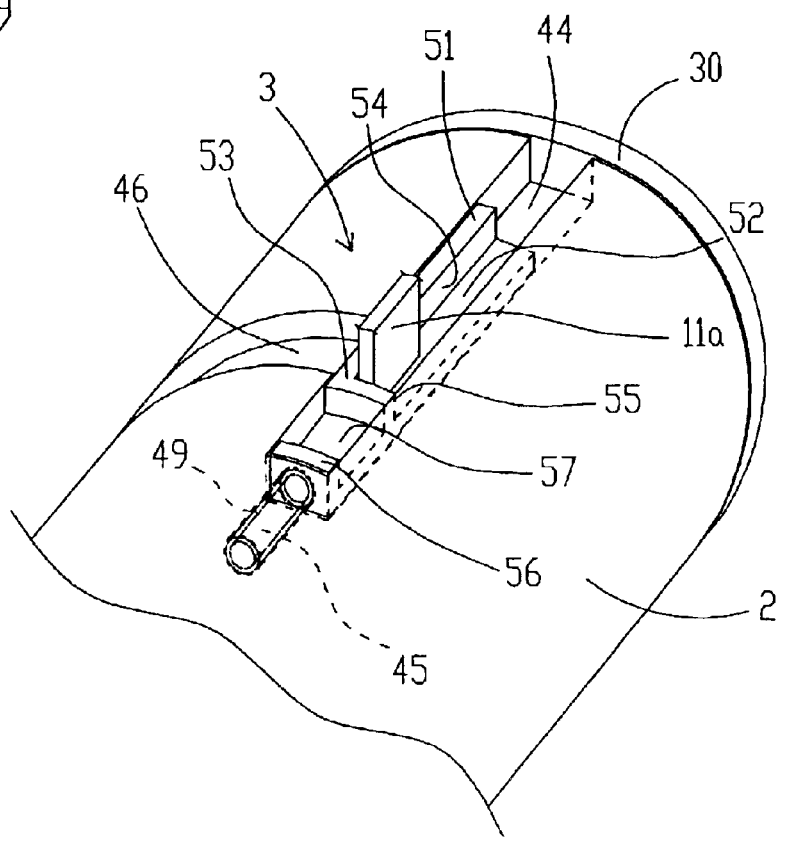
FIG. 9 is a fragmental perspective view showing a relationship between the engagement member of the rotational member and the lock member in the state of FIG. 3.

If the controller 90 determines that the signal is not a proper signal, the electromagnetic solenoid 9 does not operate, so that the engagement protruding portion 11a of the lock member 11 is maintained as shown in FIG. 9 in a state of being inserted between the first engagement portion 53 of the slide member 51 and the lateral wall of the slide groove 44, and the rotation preventing portion 54 of the first engagement portion 53 prevents the engagement protruding portion 11a of the lock member 11 from entering into the operation groove 46, which disables a rotating operation of the rotational member 2.

Figure 4:
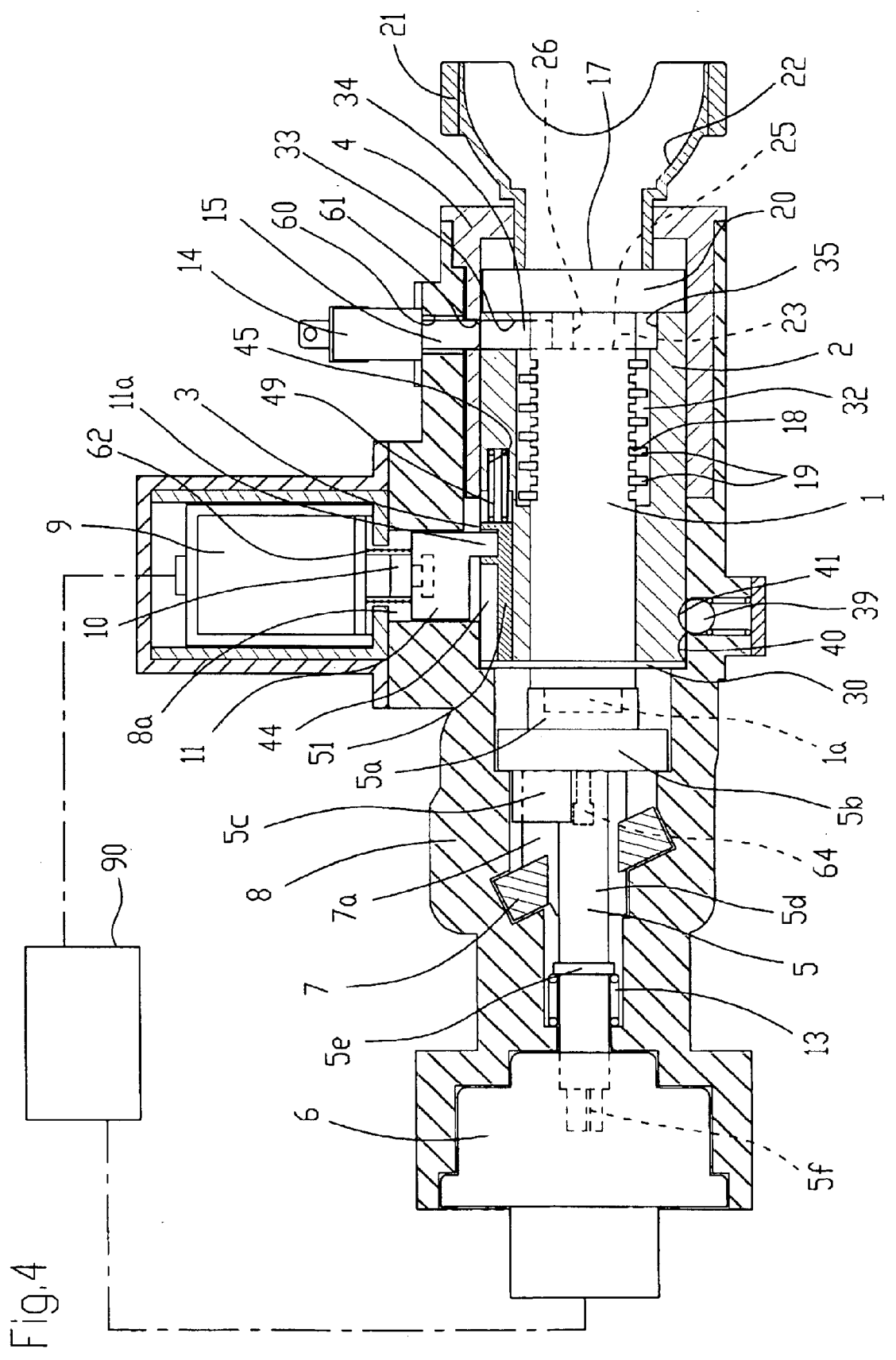
Figure 10:
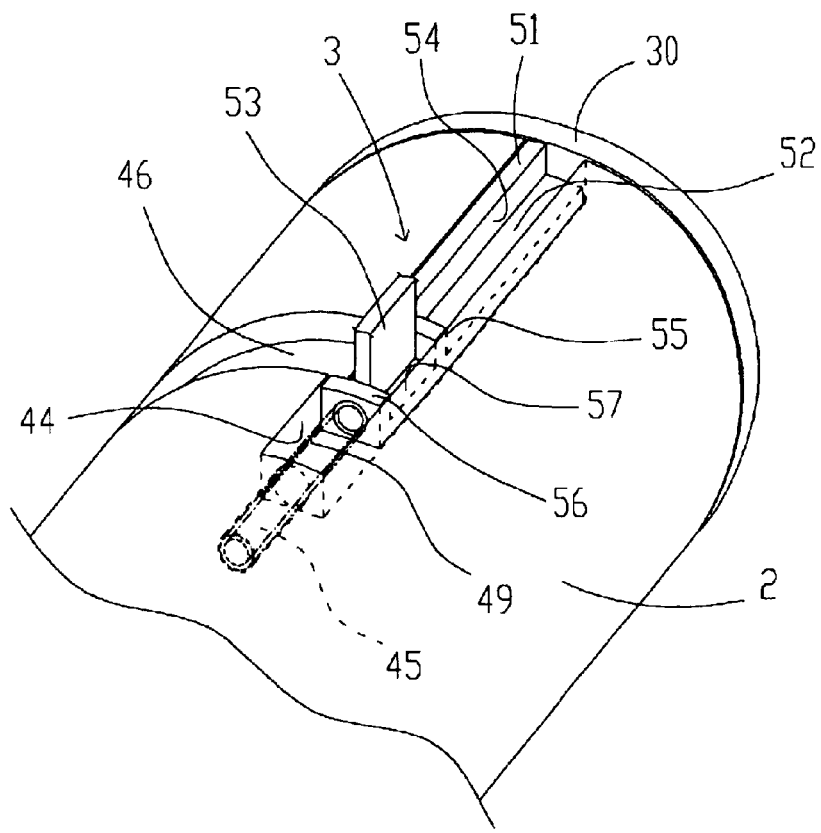
FIG. 10 is a fragmental perspective view showing a relationship between the engagement member of the rotational member and the lock member in the state of being unlocked as shown in FIG. 4.

If the controller 90 determines that the signal is a proper signal, the electromagnetic solenoid 9 operates to move the lock member 11 upward for a certain period of time. This releases engagement of the lock member 11 with the slide member 51, and a pressing force of the slide spring 49 moves the slide member 51 inside the slide groove 44 toward the rear side up to an end portion position of the slide groove 44 where the end portion of the slide member 51 is in contact with the C ring 30. When operation of the electromagnetic solenoid 9 is completed after a lapse of a certain period of time in this state, the lock member 11 is lowered by a pressing force of the spring 62 and inserted into the engagement groove 57 of the slide member 51 as shown in FIG. 4 and FIG. 10.

Since the engagement groove 57 of the slide member 51 is connected to the operation groove 46 of the rotational member 2 in this state, the engagement protruding portion 11a of the lock member 11 will not engage with the slide groove 44 of the rotational member 2 if the rotational member 2 is rotated in a clockwise direction. This enables rotation of the rotational member 2 and enables operation of the operating knob 21 for unlocking the steering shaft. If the rotational member 2 is rotated back from ACC position, ON position or START position to LOCK position, and operation of the operating knob 21 toward the front side is attempted, the engagement protruding portion 11a of the lock member 11 is engaged with the engagement groove 57, and also the slide member 51 having that engagement groove 57 is brought into contact with the C ring 30 so as not to be moved toward the rear side, which makes it impossible to move the rotational member 2 toward the front side. This prevents a driver from operating the operating knob 21 toward the front side by mistake.

Figure 6:
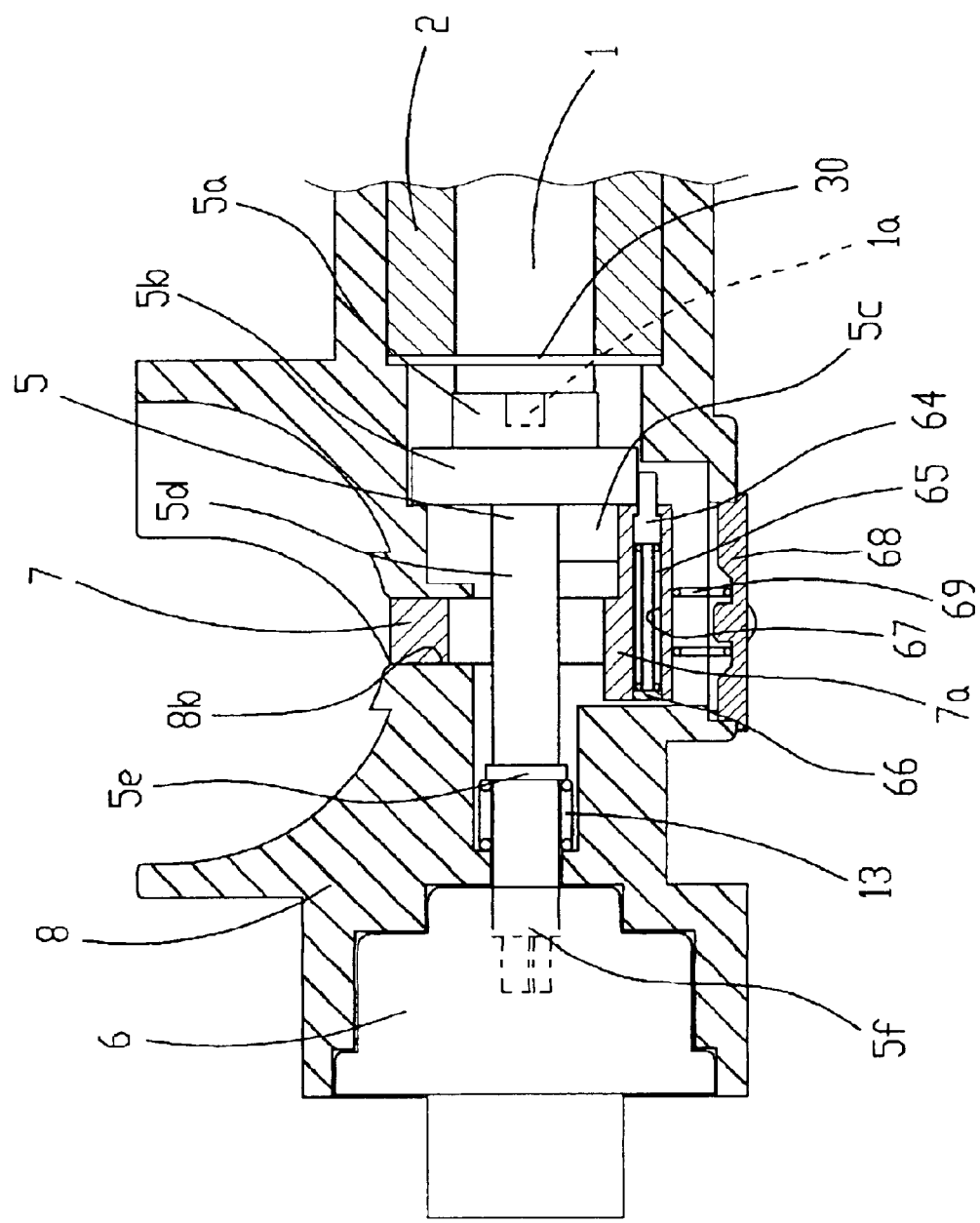
FIG. 6 is a cross sectional view showing the lock shaft in a case of an operating knob being rotated from LOCK position to ACC position.
Figure 7:
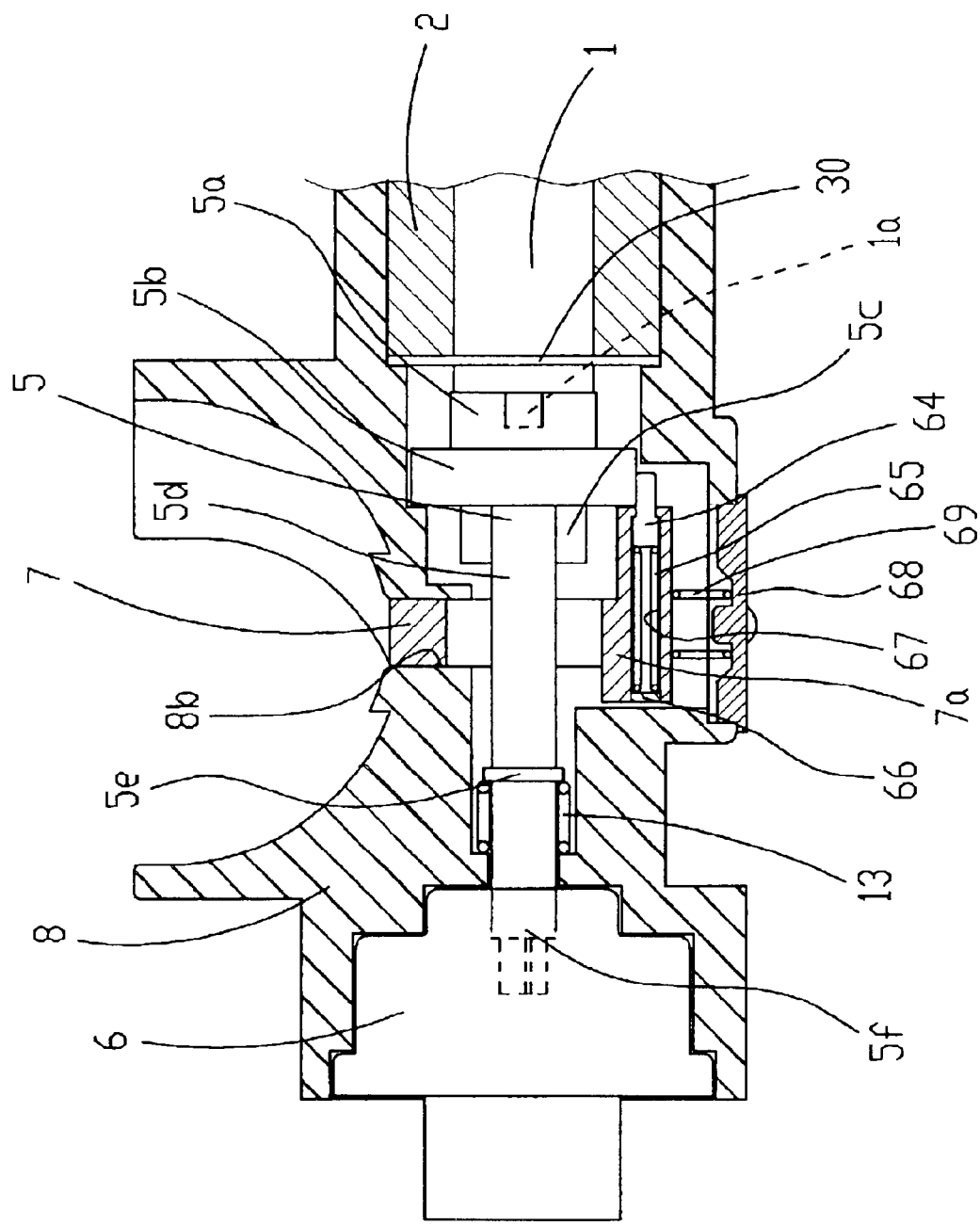
FIG. 7 is a cross sectional view showing the lock shaft in a case of the operating knob being rotated from ACC position to LOCK position.

For unlocking the steering shaft, the operating knob 21 is rotated by approximately 90 degrees from LOCK position to ACC position. Consequently, as shown in FIG. 6, with aid of the cam portion 5c of the cam member 5, the following portion 7a of the lock shaft 7 moves against a pressing force of the lock spring 69 so that a top end portion of the lock shaft 7 sinks into the body 8, which releases engagement between the steering shaft and the lock shaft 7. At this point, the pin 64 of the following portion 7a moves under the large diameter potion 5b of the cam member 5, so that by a pressing force of the pin spring 65, the pin 64 projects toward a lower side of the large diameter potion 5b. If the operating knob 21 is operated in this state to be rotated to LOCK position, engagement of the pin 64 with the large diameter potion 5b is maintained as shown in FIG. 7, and therefore the lock shaft 7 does not move. Accordingly, once the cam member 5, the key cylinder 1, and the rotational member 2 are operated to be in a rear position, and the steering shaft is unlocked, the steering shaft will not be locked no matter if the operating knob 21 is operated to any rotational position.

When the driver gets out of an automobile, the driver rotates the operating knob 21 to LOCK position and leaves the automobile with the electronic key, so that the controller 90 detects the driver leaving and operates the electromagnetic solenoid 9 for a certain period of time. Eventually, engagement between the engagement protruding portion 11a of the lock member 11 and the engagement groove 57 of the slide member 51 is released to enable the rotational member 2 to move inside the body 8 in forward and backward directions. Consequently, a pressing force of the spring 13 moves the cam member 5, the key cylinder 1, and the rotational member 2 to a front position. When operation of the electromagnetic solenoid 9 is completed, the lock member 11 is returned to a lock state where the engagement protruding portion 11a thereof is inserted into the slide groove 44 of the rotational member 2 and the rotational member 2 is locked. Here, movement of the cam member 5 releases engagement of the pin 64 of the lock shaft 7 and the large diameter potion 5b of the cam member 5, and a pressing force of the lock spring 69 moves the lock shaft 7 to a side of the steering shaft, by which the steering shaft is locked.

The above structure makes it possible to prevent the steering shaft from being left in an unlocked state since the driver does not need to operate the operating knob 21 to the front position when getting out of the automobile, and the steering shaft is returned to an initial lock state automatically.

Also, the electromagnetic solenoid 9 should be operated for just a short period of time until the slide member 51 is moved to the end portion of the slide groove 44 by a pressing force of the slide spring 49, and therefore required power is also very small.

Next description discusses a case of unlocking the steering lock with use of a key.

Figure 12:
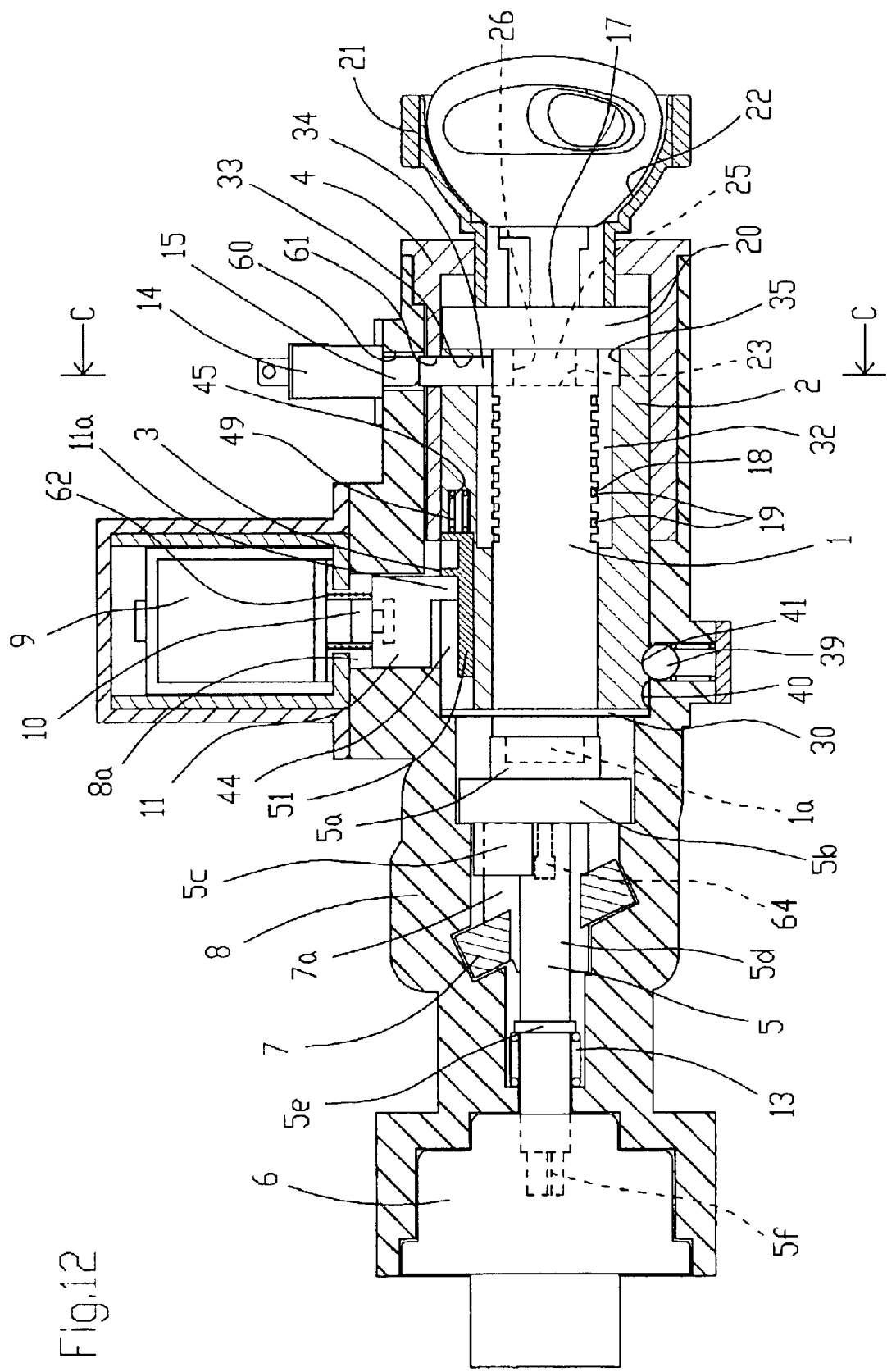
FIG. 12 is a cross sectional view showing the steering lock apparatus of the present invention with a key inserted therein.

When a key is inserted into the key insertion hole 17, an inclined portion on a top end of the key comes into contact with the slider 25, and attempts to move by pressing the slider 25 toward an upper side in the state shown in FIG. 13A. However, since the engaged member 34 that is in contact with the slider 25 is in contact with the inner circumferential wall of the holder 4, the slider 25 cannot be moved. When the key is further pushed in this state, the key cylinder 1 and the rotational member 2 move together to the rear position while the inclined portion on the top end of the key and the slider 25 are in engagement. Consequently, as shown in FIG. 12 and FIG. 13B, the through-hole 33 of the rotational member 2, the through-hole 61 of the holder 4, and the switch introduction hole 60 of the body 8 are linearly connected, as a consequence of which the engaged member 34 pressed by the slider 25 escapes from the key cylinder 1 into the switch introduction hole 60 and presses the actuating lever 15 of the key detection switch 14 to turn the key detection switch 14 on. At this time, since a contact face between the engaged member 34 and the slider 25 is aligned with a contact face between the key cylinder 1 and the rotational member 2, the engaged member 34 is out of engagement with the key cylinder 1. The movement of the slider 25 to the upper side makes it possible to insert the key completely, and if the key is inserted, the tumblers 19 sink into the key cylinder 1, which enables the key cylinder 1 to rotate relative to the rotational member 2. Further, since the engaged member 34 is positioned so as to cross over the rotational member 2 and the holder 4, the rotational member 2 and the holder 4 are brought into connection with each other.

When the key is extracted from the key cylinder 1, the tumblers 19 of the key cylinder 1 are returned to a state of projecting from the outer circumferential face of the key cylinder 1, and the slider 25 is also moved to a lower side by a pressing force of the spring 27, so that the engaged member 34 leaves the switch introduction hole 60 to release connection of the holder 4 and the rotational member 2. Eventually, the spring 13 moves the rotational member 2 together with the key cylinder 1 to the right side of FIG. 1, by which an initial position of the key cylinder 1 and the rotational member 2 is recovered.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therewith.

What is claimed is:

1. A steering lock apparatus, comprising:

a rotational member having an engagement member;

an operating portion on a front side of said rotational member for rearward movement and rotational operation of said rotational member;

a holder for holding said rotational member movably in forward and backward directions and for holding said rotational member rotatably in a rear position;

an actuator to be driven by a signal transmitted by a controller upon detection of said rotational member being operated toward a rear side; and a lock member that is to be operated by said actuator so as to be engaged with said engagement member in LOCK position for preventing rotation of said rotational member, such that said rotational member is held rotatably in the rear position, and disabled from moving to a front position, when said rotational member is operated to the rear position to release engagement between said engagement member and said lock member.

2. The steering lock apparatus according to claim 1, wherein said engagement member includes a slide groove provided in an axial direction on a lateral wall of said rotational member, and a slide member movably provided in said slide groove and pressed to toward the rear side by a spring, with said slide member having (i) a first engagement portion that is to engage with said lock member to prevent rotation of said rotational member and movement of said slide member toward the rear side, and (ii) a second engagement portion that is to engage with said lock member to prevent movement of said slide member toward a front side together with said rotational member, such that said sliding member is pressed by said spring when said first engagement portion engages with said lock member and said rotational member is operated toward the rear side, then said slide member is moved toward the rear side within said slide groove via a pressing force of said spring after engagement between said first engagement portion and said lock member has been released, and said lock member is operated to be in a lock state again when said lock member engages with said second engagement portion to prevent movement of said rotational member toward the front side.

3. The steering lock apparatus according to claim 2, further comprising:

a pressing member for pressing said rotational member toward the front side, such that said pressing member moves said rotational member to the front position when engagement between said second engagement portion and said lock member is released.

* * * * *